Figure 2:
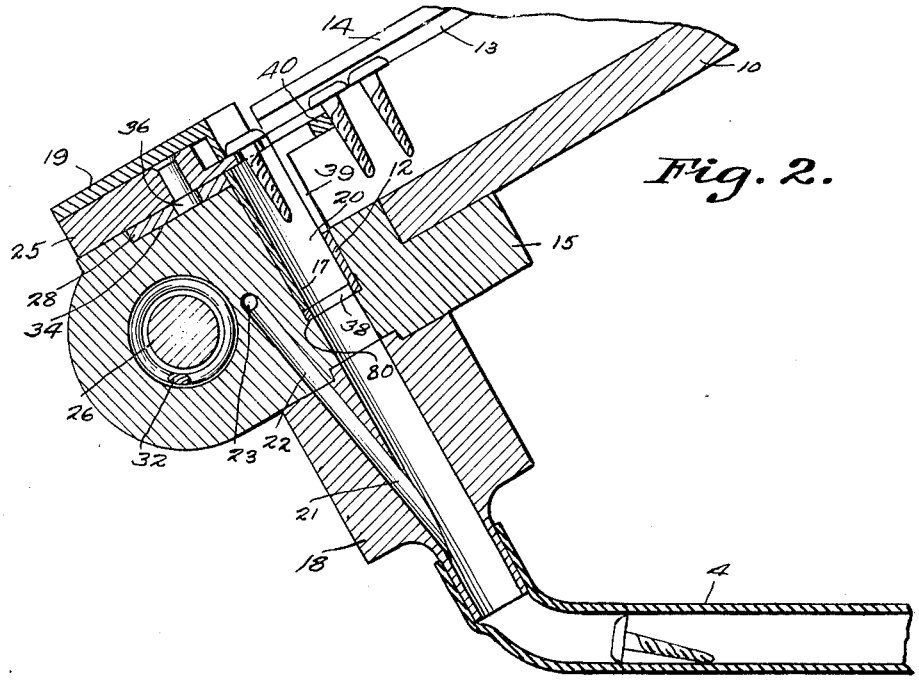

April 26, 1966  M. A. MacDONALD  3,247,874
POWER OPERATED SCREW DRIVER AND FEEDING MECHANISM
Original Filed Sept. 2, 1955  7 Sheets-Sheet 1

Murdo A. MacDonald
INVENTOR
BY C. A. Snow & Co.
ATTORNEYS.

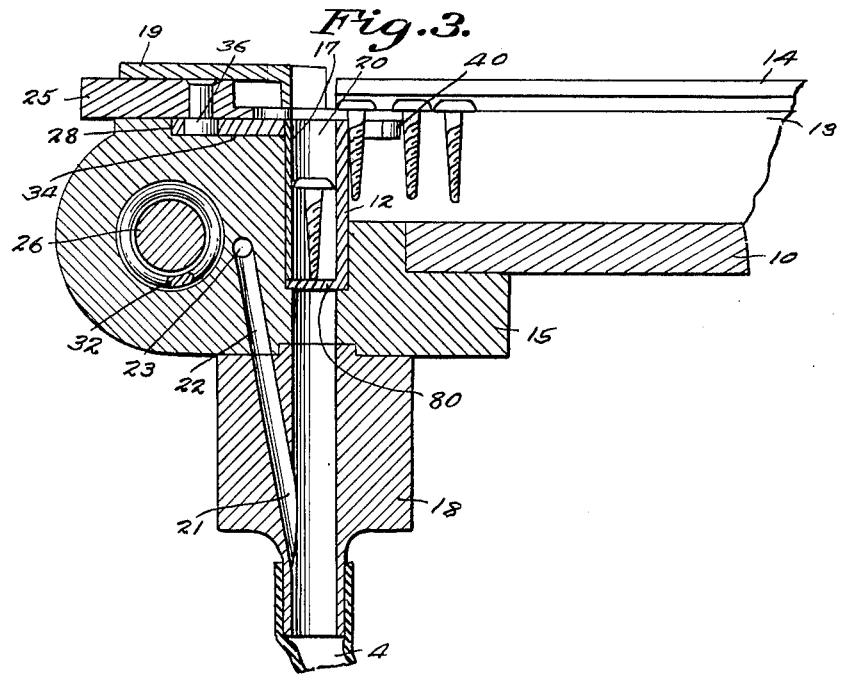
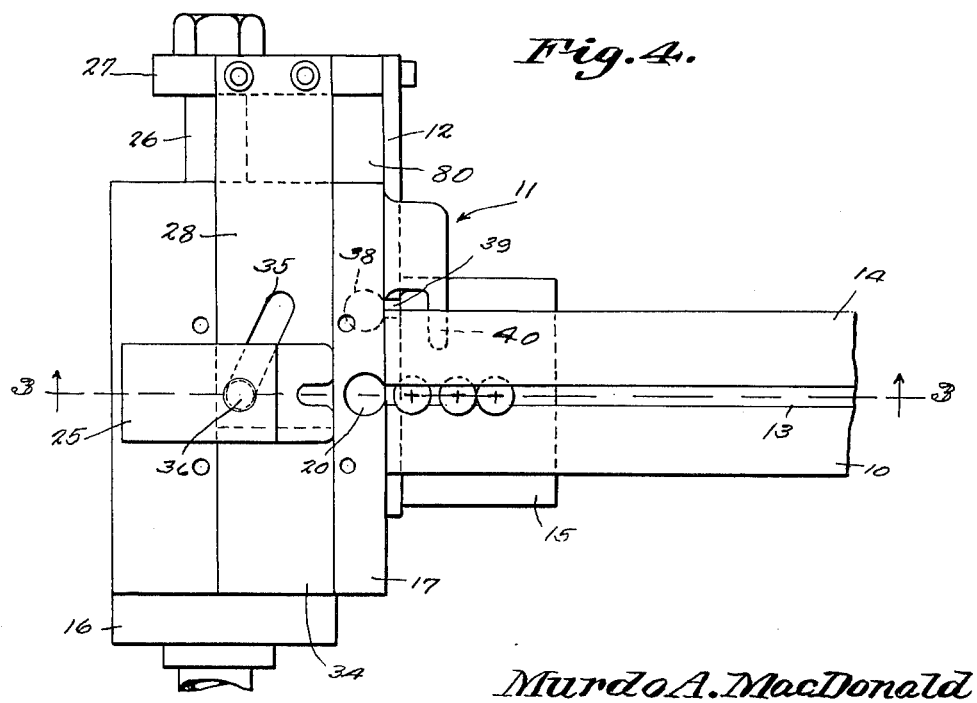

Murdo A. MacDonald
INVENTOR

BY C. A. Snow & Co.
ATTORNEYS.

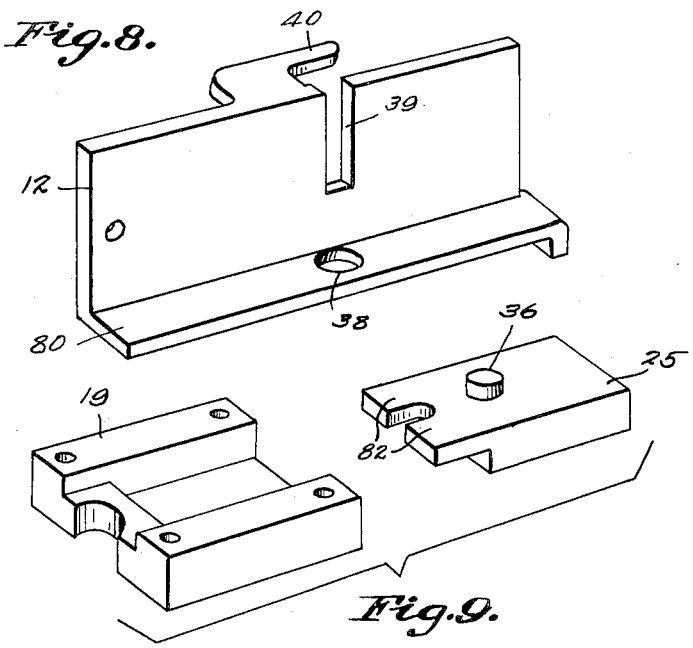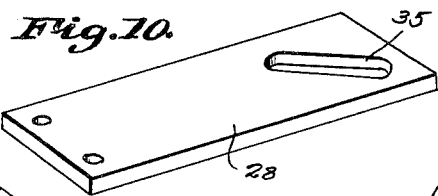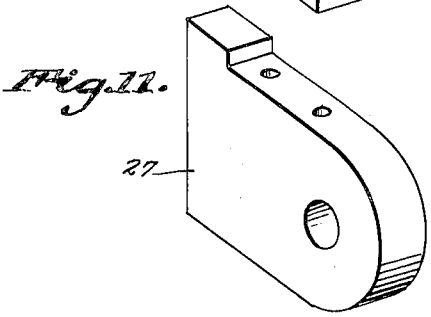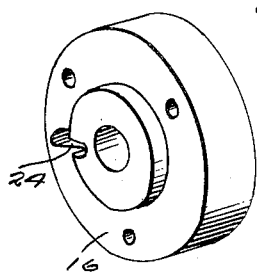

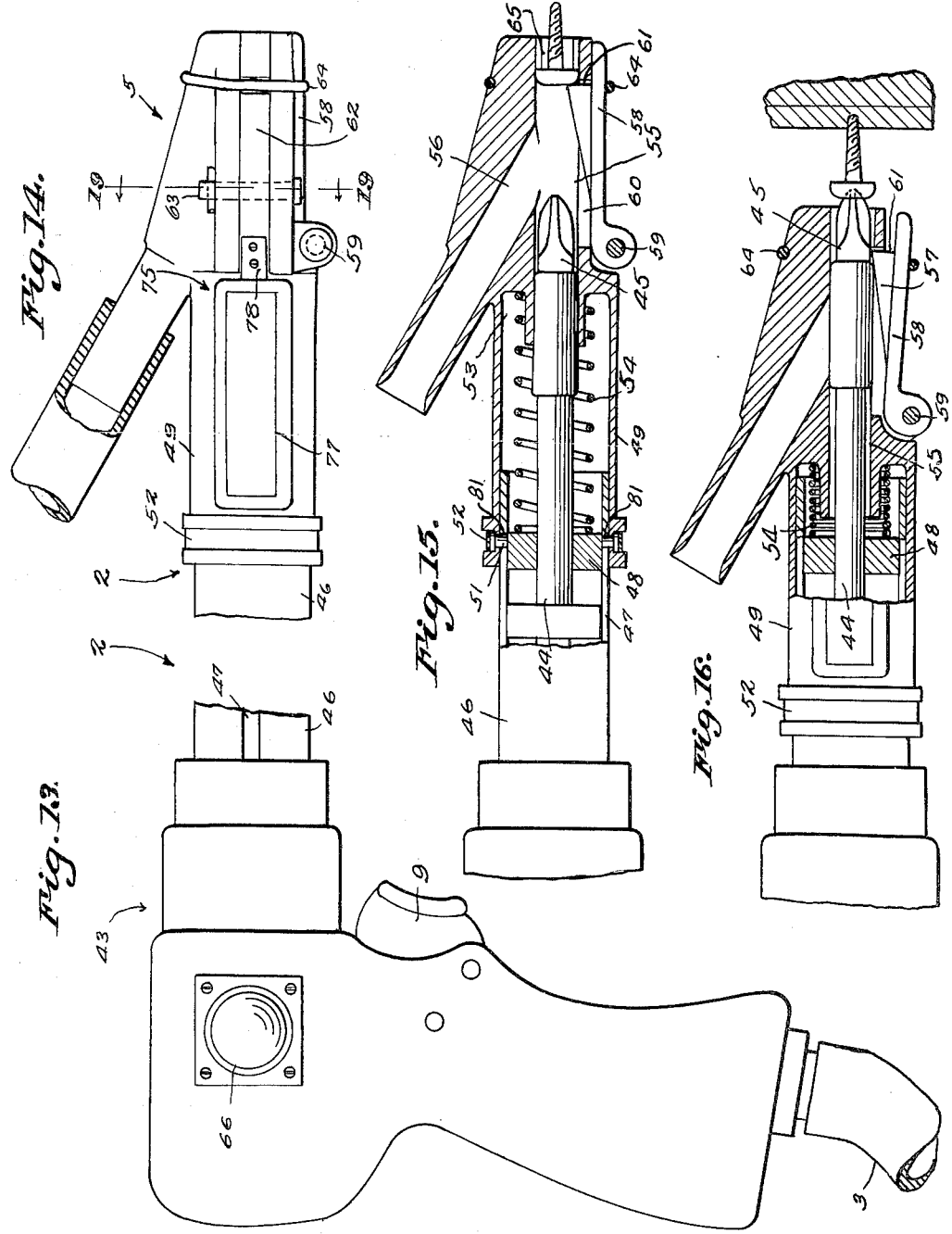
April 26, 1966   M. A. MacDONALD   3,247,874
POWER OPERATED SCREW DRIVER AND FEEDING MECHANISM
Original Filed Sept. 2, 1955   7 Sheets-Sheet 5
Murdo A. MacDonald
INVENTOR
BY C. A. Snow & Co.
ATTORNEYS.

April 26, 1966      M. A. MacDONALD      3,247,874
POWER OPERATED SCREW DRIVER AND FEEDING MECHANISM
Original Filed Sept. 2, 1955      7 Sheets-Sheet 6
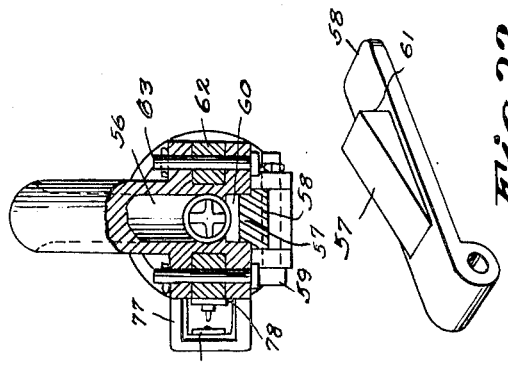
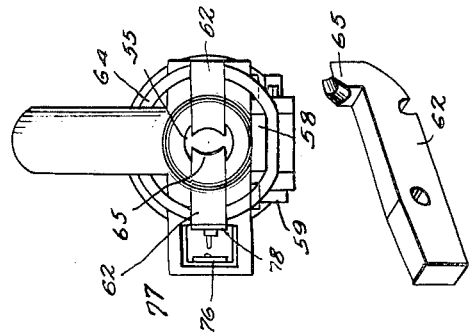
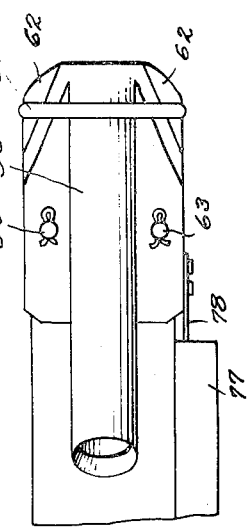
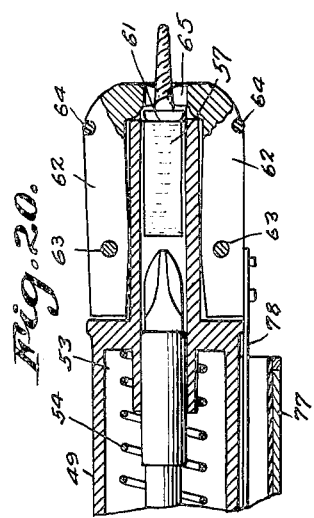
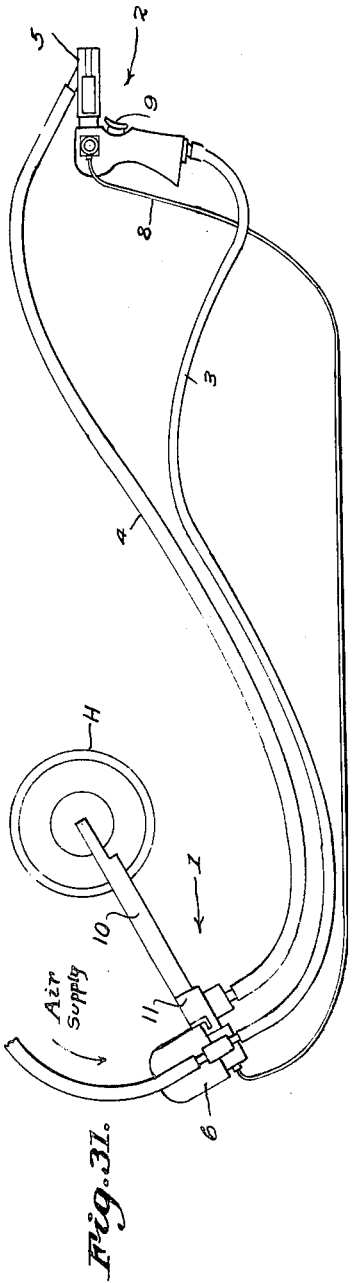
Murdo A. MacDonald
INVENTOR
BY *C. A. Snowles*
ATTORNEYS.

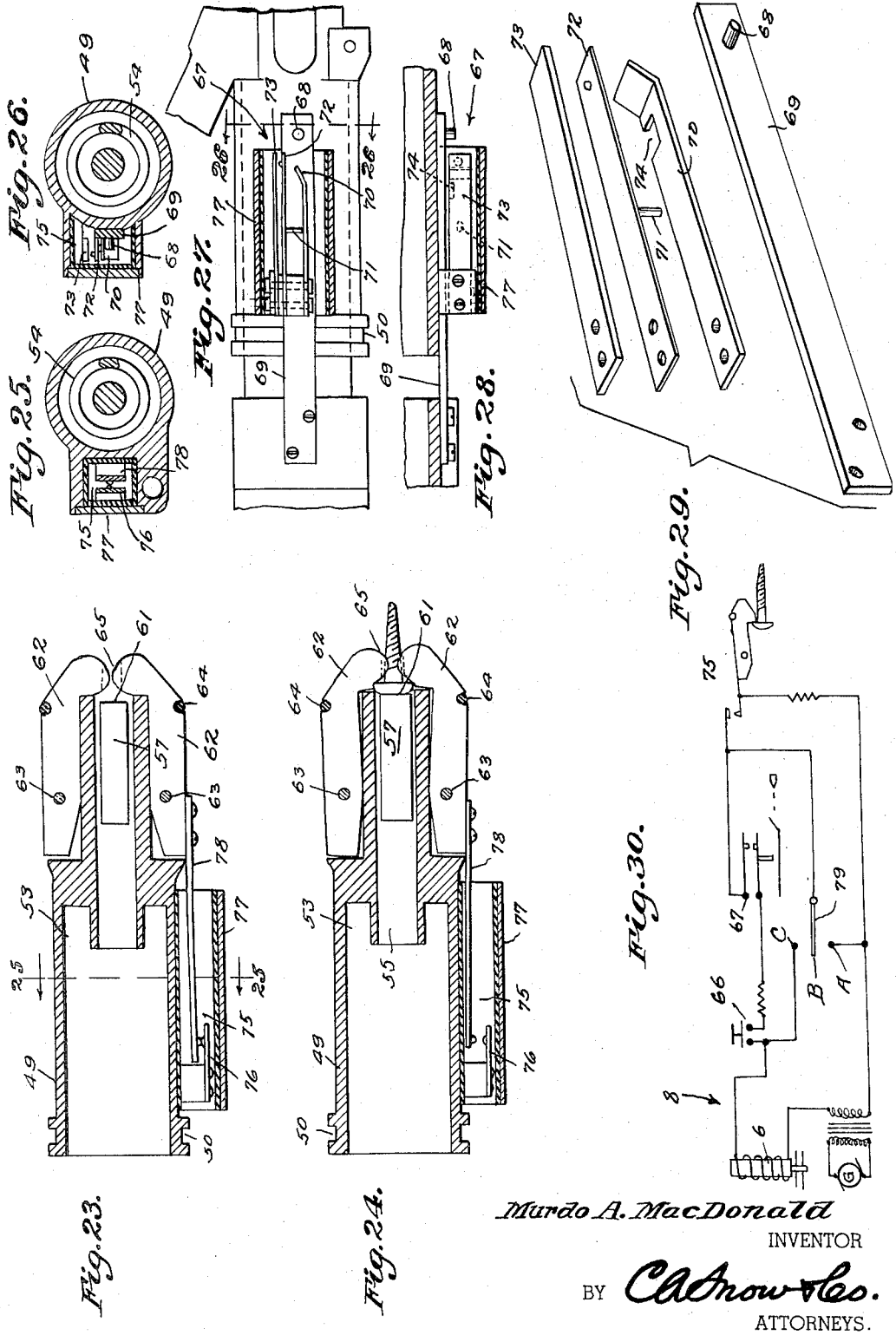

United States Patent Office 3,247,874
Patented Apr. 26, 1966

3,247,874
POWER OPERATED SCREW DRIVER AND FEEDING MECHANISM
Murdo A. MacDonald, Detroit, Mich., assignor, by mesne assignments, to Tru-Tork, Inc., Troy, Mich., a corporation of Michigan
Continuation of application Ser. No. 532,133, Sept. 2, 1955. This application Nov. 27, 1961, Ser. No. 161,760
37 Claims. (Cl. 144—32)

This invention relates to a power operated screw driver and feeding mechanism for automatically driving screws and related fasteners on a speed, mass production basis, in industrial plants. Although intended primarily for this use, it is equally adaptable for piece work on small scale operations. This application is a continuation of applicant's pending application Serial No. 532,133, filed September 2, 1955, now abandoned and supersides it.

Heretofore, none of such devices has been so constructed as to be adapted for mass use at high speed in industry and at present is not being so used. This is due to any or many of a number of reasons, primarily poor designs.

An object of this invention is to provide such a device, which is simple in form and construction, reliable, and positive in action, which consists of a screw driver attachment or adaptor and a feeding mechanism for cooperation with a holder and driver bit, and powered by an air driven or electric motor which is conventional.

Another object is to provide a portable, efficient, inexpensive power driver and feeding mechanism.

A further object is to provide a screw driver device which is designed to handle wood and metal screws with all types of heads.

Another further object is to provide the adaptor with an improved gate to positively hold the screw point protruding outwardly beyond the holding jaws, so as to be able to quickly insert the screw in a pilot hole and so speed up the work.

A still further object is to provide a simple, positive, screw feeder, as part of the feeding mechanism, which will, when actuated, drop the fasteners, one by one, as needed directly into the delivery tube, and so eliminate an intervening carrier, which is found on conventional equipment, between the screw feeder and the delivery tube.

A yet further object to provide a switch control for the solenoid which actuates the screw feeder, which control is selective in use; that is, it can be set for automatic action in mass production work, or set for a triggered delivery of each fastener, or set for the triggered delivery with an added function to speed the work.

Other objects and advantages of the invention will become apparent in the body of the specification and claims.

Certain features of the invention are herein illustrated and described.

Figure 1:
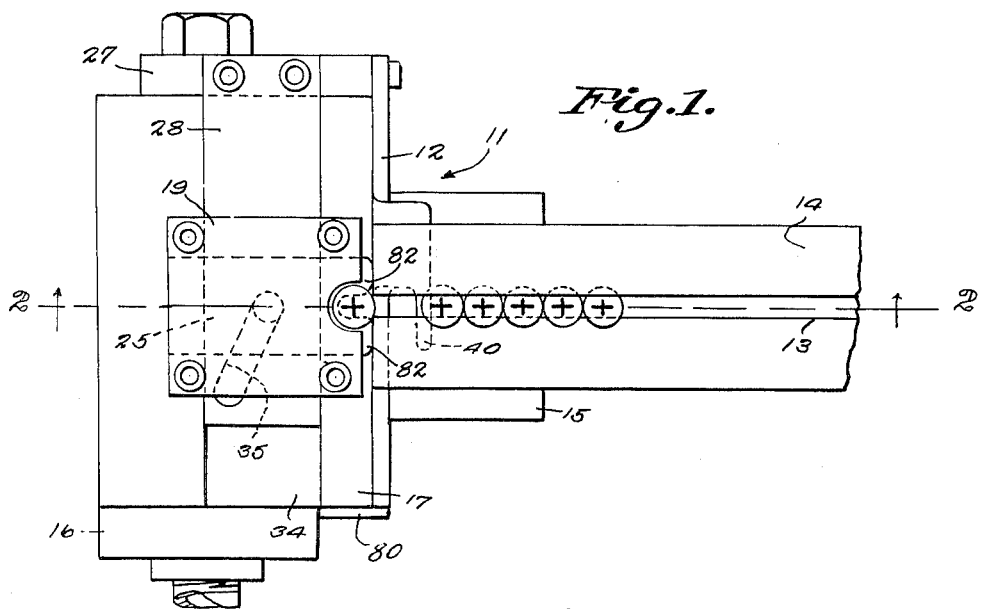
Figure 5:
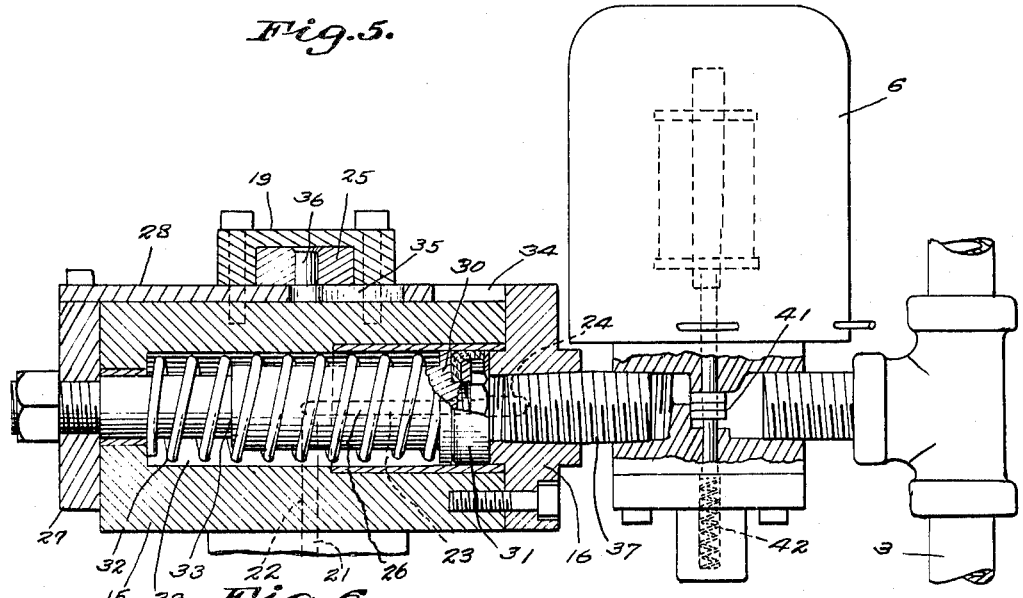
Figure 6:
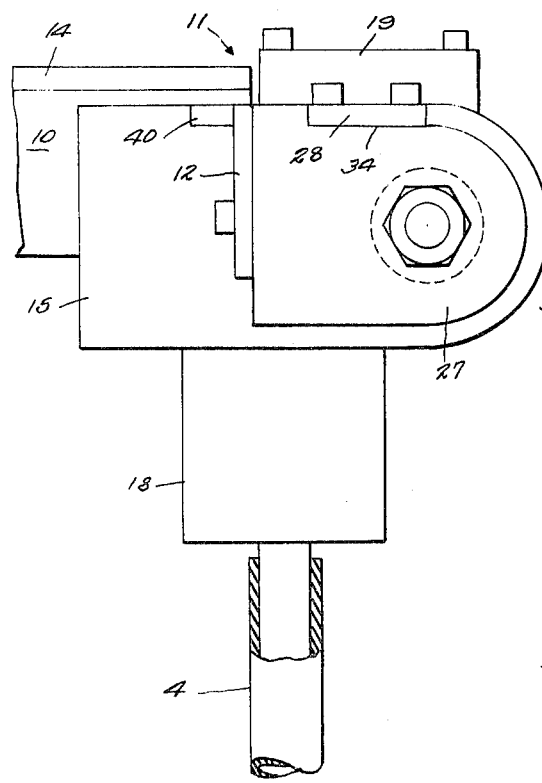
Figure 7:
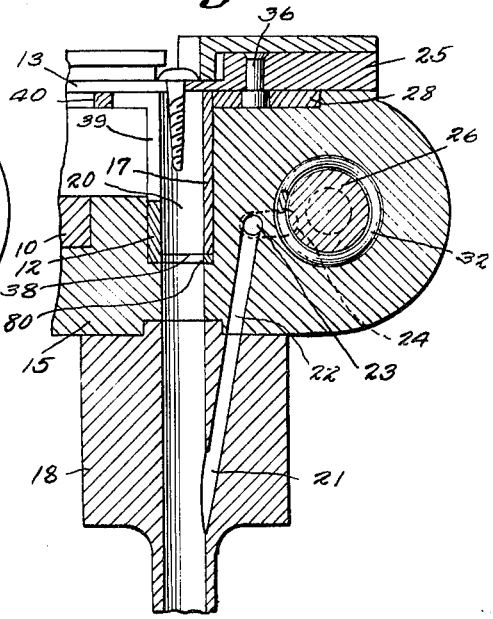

In the drawings:
FIG. 1 is a plan of my screw feeding mechanism in stopped position.
FIG. 2 is an elevation in section, along line 2—2 of FIG. 1, of the screw feeder tilted for normal use.
FIG. 3 is an elevation in section, along line 3—3 of FIG. 4, of the screw feeder.
FIG. 4 is a plan of the screw feeder in operative position with the slide cap removed.
FIG. 5 is a side elevation, partly in section, of the feeder block and solenoid along the center line of the plunger.
FIG. 6 is a rear elevation of the screw feeder.
FIG. 7 is a rear elevation of the screw feeder, in section along the center line of the chute.
FIG. 8 is an isometric view of the screw feed slide.
FIG. 9 is an inverted isometric view of the slide cap and screw slide support, aligned for assembly.
FIG. 10 is an isometric view of the slide cam.
FIG. 11 is an isometric view of the plunger slide link.
FIG. 12 is an isometric view of the cylinder head, showing the inner face.
FIG. 13 is an elevation of the screw driver holder partly broken away.
FIG. 14 is a plan of the adaptor, with automatic loading switch.
FIG. 15 is a plan of the adaptor, fitted to the end of the screw driver holder, partly in section.
FIG. 16 is a plan of the adaptor, partly in section, in operative position.
FIG. 17 is an elevation of the work end of the adaptor.
FIG. 18 is an end view of the adaptor as seen in FIG. 14, showing the holding jaws.
FIG. 19 is an end view of the adaptor, in section along line 19—19 of FIG. 14.
FIG. 20 is an elevation of the adaptor, partly broken away and partly in section, showing the holding jaws and screw.
FIG. 21 is an isometric view of a holding jaw.
FIG. 22 is an isometric view of the stop gate.
FIG. 23 is an elevation of the adaptor partly in section, showing the automatic loading switch.
FIG. 24 is an elevation as seen in FIG. 23 with the adaptor loaded and the automatic switch open.
FIG. 25 is an end view in cross section along line 25—25 of FIG. 23.
FIG. 26 is an end view in cross section along line 26—26 of FIG. 27.
FIG. 27 is a plan of the adaptor, partly broken away, showing partly in section the push button circuit breaker.
FIG. 28 is an elevation partly in section of the push button circuit breaker, as attached to the adaptor and holder.
FIG. 29 is an enlarger isometric view of the separate circuit elements of the circuit breaker of FIG. 27.
FIG. 30 is a diagrammatic sketch of the wiring circuits for FIGS. 13, 23, and 27, controlling the solenoid.
FIG. 31 is a diagrammatic elevation of the layout of my Power Operated Screw Driver and Feeding Mechanism.

Many attempts have been made in the last four decades to design a power screw driver which is adaptable to mass production methods, automatic, rapid in operation, and thoroughly reliable. My new device is an improvement over the older structures, some of which are on the market. These embody the principles found in the following U.S. patents: Moore, 2,534,140, Dec. 12, 1950; Krasnow, 2,544,165, Mar. 6, 1951; Moore, 2,706,504, April 19, 1955.

My invention serves the same purpose, but also has many advantages over the older devices and so is the best solution of this long standing problem.

In the embodiment of the invention disclosed herein, the construction comprises a simplified feeding mechanism 1, FIG. 31, to deliver screws, as desired, for driving, a power screw driver 2, FIG. 31 for speed driving of these screws, flexible air tubes 3 and 4 to receive compressed air, as the motive force, to power the air turbine of the screw driver and to deliver screws to the adaptor 5 on the screw driver, a solenoid 6 to control compressed air valve 41 to operate the screw feeder 11, FIGS. 1 and 31, an electric circut 8, FIG. 30, to actuate the solenoid, and a trigger 9 on the screw driver to actuate the air turbine.

*Feeding mechanism*

The feeding mechanism 1 is mounted on a suitable support so that the chute 10, FIG. 2, is upright and inclined upwardly about 30° to receive screws from a conventional hopper H, FIG. 31. The chute is attached to screw or fastener feeder 11, FIG. 1, which receives the screws by gravity feed from the chute, one by one, according to the timed action of the screw feed slide 12, FIGS. 1, 2 and 8. These screws then drop through a slot 39 in the movable slide directly into a feed bore 20 and from there into the delivery tube 4 at the proper time, in a step by step action, which follows a planned time-position sequence.

The chute 10 along its top side has a longitudinally extending deep vertical slot which forms a screw track 13 to support the screws issuing from the hopper by suspension of their heads. A track cover 14 is attached to the top of chute 10 so as to partly overlie screw track 13, but above the normal head position of the screws. This prevents displacement of the screws as they slide by gravity down track 13. The chute 10 at its inner and lower end is seated in a recess in feeder block 15 and fixedly attached thereto.

Screw feeder 11, FIG. 1, is built around feeder block 15 as the structural frame. The other fixed parts of screw feeder 11 are the cylinder head 16 and slide block 17, FIG. 4. The latter is mounted in a slot across feeder block 15 and fastened thereto. This block 17 has a fastener delivery tube or feed bore 20 transversely disposed across the middle of the block 17 and intersecting the face adjacent chute 10. When block 17 is fastened into position this bore 20 is vertically disposed and aligned with screw track 13, FIG. 4. On the underside of feeder block 15 tail block 18 is positioned and fastened with its center bore aligned with feed bore 20. The air channel 21 in tail block 18 diverges upwardly from the lower end of the center bore and aligns with and connects to the feed block air channel 22, which connects with a horizontal passage 23 in feeder block 15, FIG. 5, and outlet duct 24, FIGS. 7 and 12, in cylinder head 16. Screwslide cap 19, FIGS. 1 and 9, houses screw or fastener slide support 25, as a slide bearing for support 25, as it reciprocates.

The other moving parts of screw feeder 11 are fastened together and move as a unit, including screw feed slide 12. Plunger 26, FIG. 5, is a reciprocating motor and is fastened to plunger slide link 27, FIG. 11, which is fastened to slide cam 28, FIG. 10, and screw feed slide 12. Slide cam 28 actuates screw slide support 25. Plunger 26 is mounted in a cylindrical bore 29 extending inwardly of feeder block 15 from the cylinder head 16. Cylinder head 16 has a threaded center bore therethrough and an air nipple 37 seated therein to supply compressed air against the enlarged head 30 of plunger 26. A leather cup 31 is positioned on head 30 and bears against the bore to form an air seal. Surrounding plunger 26 there is a coiled return spring 32 which bears against a flange of the enlarged head at one end and against the inner end of the cylindrical bore at the other. The other end of the plunger 26 is reduced in diameter which forms a shoulder 33. This shoulder abuts against the inner end of bore 29 in action to limit the outward thrust of the plunger, as seen in FIG. 5. The plunger out beyond the reduced end is threaded and fastened with a nut to link 27.

Slide cam 28 is rectangular in shape and reciprocates in slideway 34, FIG. 4, and has cam slot 35 diagonally disposed therein as shown. Screw slide support 25 has a cam pin 36, FIG. 9, on the underside which engages in slot 35. As slide cam 28 reciprocates, slot 35 will cause pin 36 and screw slide support 25 also to reciprocate, but at right angles thereto due to the constraint of slide cap 19. The limits of movement of screw slide support 25 are seen in FIGS. 1 and 4. As the plunger 26 and slide link 27 move outwardly to the position seen in FIG. 4, the screw seen in FIG. 2 suspended on screw slide support 25 is released and falls in feed bore 20 to rest on screw feed slide 12, FIG. 3.

Screw feed slide 12, FIG. 8, is shaped as shown and is fastened to a vertical side face of plunger slide link 27, so that it can reciprocate in the space between slide block 17 and the end of chute 10. The flat horizontal slide member 80 below and attached to feed slide 12 has a bore 38 midway of its length and adjoining the vertical feed slide 12. In this slide an opening or rectangular shaped slot 39 is cut therethrough and extends down from the top and terminates above feed slide bore 38 and in line therewith.

Along the top edge of screw feed slide 12, a finger 40 extends horizontally outwardly midway of its length and is turned to extend across slide slot 39 in spaced relation thereto. The flat horizontal bottom section 80 of screw feed slide 12 moves in the space between the bottom of slide block 17 and feeder block 15, as seen in FIGS. 2 and 3. The outwardly extending finger 40 of feed slide 12 moves in a slot in the upper side end of chute 10. When plunger 26 is in fully retracted inoperative position, the moving parts are positioned as shown in FIG. 1. In this position, screw track 13, feed slide slot 39, feed bore 20 and feed slide bore 38 are in alignment in the same vertical plane. In FIG. 4 when plunger 26 has been thrust outwardly, feed slide bore 38 and feed slide slot 39 have moved out of this planar alignment.

As seen in FIG. 5 and FIG. 31, air tube 3 pipes compressed air direct to the air turbine in screw driver 2. A T-coupling in this line diverts this also to air valve 41 controlled by solenoid 6, which connects through nipple 37 and cylinder head 16 to plunger bore 29. Thus the operation of screw feeder 11 depends upon the regulation and control of compressed air in the bore 29 on cup 31 by means of solenoid 6. This solenoid has a soft iron core, which extends downwardly to the spring pressed air valve 41, FIG. 5. As illustrated and understood, the air valve spring 42 keeps the valve normally closed. The solenoid is wired in series into the 115 v. 60 cycle A.C. circuit, as seen in FIG. 30. It is designed to handle air pressures up to 150 lb. per in.$^2$, although the desirable working pressures for this screw driver and feeding mechanism vary from 60 to 95 lbs. per in.$^2$. As the solenoid 6 is momentarily energized, air valve 41 opens and plunger 26 with the connected moving parts are quickly displaced to full operating position, FIG. 4. As the current in circuit 8 is cut off, valve 41 closes and return spring 32 reverses the position of these moving parts to that seen in FIGS. 1 and 5. This action does not affect air pressure in tube 3 to the air motor in screw driver 2. The air which has entered bore 29 escapes under the added pressure of the return spring 32 on leather cup 31, out through outlet duct 24, air passage 23 and air channels 22 and 21 to impel the screw in delivery tube 4 into adaptor 5, positioned for driving.

*Operation of feeding mechanism*

It is understood from the description above that the reciprocation of the movable parts is accomplished by the compressed air in bore 29 acting on plunger 26, moving it outwardly, and the counter action of return spring 32, which reverses this movement, when the compressed air is cut off by valve 41. A continuous line of screws moves down screw track 13 by gravity from hopper H. For this description the screw in screw track 13 resting against finger 40, FIG. 2, will be taken as the first to pass through this mechanism. Here, feed slide slot 39 is aligned with track 13, but it is out of reach of the first screw due to the interposition of finger 40. As air pressure on plunger head 30 moves screw feed slide 12 outwardly slide slot 39 moves out of registration with track 13, then finger 40 also moves clear of track 13. This permits all the screws in track 13 to move downwardly one place until the first screw rests against the vertical side of feed slide 12 as seen in FIG. 4. As feed slide 12 returns, finger 40 moves between the first and second screws. At the same instant screw slide support 25 moves towards feed slide 12. At the end of this inward stroke feed slide slot 39 is again opened to receive the first screw, which then slides onto the fingers 82 of slide support 25 as seen in FIG. 1. On the next impulse to solenoid 6 slide support 25 is again retracted and the first screw now drops to the position seen in FIG. 3 and rests point down against the bottom section 80. At the same time the second screw (number 2) has slid down against the vertical side of feed slide 12 as seen in FIG. 4. As air valve 41 shuts off, feed slide 12 returns, finger 40 moves between screws number 2 and 3, screw number 2 moves onto support 25 and the first screw, FIG. 3, resting on bottom section 80 of feed slide 12, now drops into delivery tube 4, FIG. 2, where it momentarily rests. When solenoid 6 is again energized, this cycle is repeated, and each screw moves down one step. As the solenoid is de-energized the screw resting in delivery tube 4, FIG. 2 is impelled by the escaping air from bore 29 up to position in the nose of the adaptor 5 for driving.

From the above description and the drawings, it will be apparent that slide 12 may be viewed as providing an escapement which permits screws to enter a lateral opening in bore or passageway 20 while the screw shanks are oriented generally parallel to the longitudinal extent of the passageway. Finger 40 may be termed a separator and slot 39 and the portion of slide 12 to the right of the slot (FIG. 8) may be termed an introducing means since screws pass through slot 39 as they are introduced into bore or passageway 20. Slide 25 may be termed a transitional support which supports the screws upon their entry into bore 20 and maintains the desired orientation of the screws.

Slide 25 also provides a second escapement which when it retracts releases a screw for longitudinal movement in bore 20. Bottom section 80 and opening 38 in slide 12 may be viewed as providing a third escapement which permits a screw to move longitudinally from the upper portion of passageway 20 to the lower portion thereof. In all of these various steps, the shank of the screw maintains its orientation longitudinal of passageway 20.

*Power driven screw driver*

The screw driver 2, FIGS. 13 to 16, consists of a holder 43, housing an air turbine to turn driver shank 44 and bit 45, and the adaptor 5, FIG. 14, mounted on the end of barrel 46. The driver shank 44 connects with the air turbine through a clutch not shown, which is engaged by work pressure against the end of bit 45. The shank 44 turns in bearing 48 fixedly mounted within barrel 46. The air turbine receives air under pressure through tube 3 controlled by a valve operated by trigger 9. The holder 43 is designed and powered to drive the bit 45 at a rapid speed. All of this structure of screw driver 2 is entirely conventional and on sale on the open market except for the adaptor 5 of FIG. 14. This adaptor 5 is a very important feature of my invention. The barrel 46 has double-ended longitudinal slots 47 on opposed sides.

The adaptor 5 has a cylindrical section 49 to telescope over barrel 46 and connect thereto. On the end of section 49 there is a circular groove 50, FIG. 23, with two opposed holes 81 therethrough. These receive retaining pins 51, FIG. 15, held in place by a split circular spring ring 52 fitted in groove 50. The pins 51 extend inward radially and engage in the slots 47, thus holding adaptor 5 slidably engaged on barrel 46. Cylindrical section 49 is hollow and defines an annular recess 53 at its inner end. In cylindrical section 49 a coiled spring 54 is mounted under compression, seats in annular recess 53 and bears against bearing 48. This normally holds adaptor 5 in extended position.

A longitudinal bore 55 extends through the head of the adaptor 5 in alignment with screw driver shank 44. A screw receiving nozzle 56 having a cylindrical bore is formed on a sharp converging angle to intersect bore 55 midway of its length. The bore of receiving nozzle 56 is in line with the face of cam 57 of stop gate 58, which is mounted on an external transverse hinge pin 59. This stop gate 58 extends longitudinally from hinge pin 59 along the outer side of adaptor 5 to its work end. The inner side of stop gate 58 consists of a cam 57 converging from near hinge pin 59 inwardly into bore 55. Cam 57 fits within a rectangular slot 60. The outer end of cam 57 terminates in a flat radial shoulder 61, so as to engage over part of the top of a head of a screw positioned for driving, without interfering with the end of bit 45.

Ordinarily in use the receiving nozzle 56 extends horizontally to one side as the screw driver 2 is held with handle pointed downwardly. In this position the head of adaptor 5 has two holding jaws 62 which pivot in a vertical plane. These jaws are pivoted on hinge pins 63 and seat in opposed recesses as seen in FIGS. 17–20 inclusive. The stop gate 58 and the holding jaws 62 are termed a fastener holder and they cooperate to receive and positively hold a fastener in extended driving position. The holding jaws 62 have a transverse groove across the outer side near the work end, which receives an annular elastic ring, such as rubber, as seen at 64. Holding jaws 62 have inwardly turned outer ends, which terminate in holding fingers 65 as seen in FIGS. 18, 20 and 21. When the adaptor head is not loaded, these holding fingers 65 are very close to each other as seen in FIG. 18 and the holding jaws are held seated in the bottom of their recesses as seen in FIG. 23. The holding jaws 62 are beveled on their inner surface between the hinge pin and the innermost end. This is to permit the jaws to be spread in opposition to the resiliency of rubber ring 64, when a screw is thrust between them into operative position, as seen in FIGS. 20 and 24. Here it is seen that holding fingers 65 snugly hold the screw with points projecting outwardly and head seated against the shoulder 61 of stop gate 58.

When a screw is delivered to the nose of the adaptor 5, the air pressure behind it sends it with such force that it glides over the face of cam 57 as it strikes it and lodges between holding fingers 65 as seen in FIGS. 15 and 24. It is now ready to be driven into the work by pressing on holder 43 and squeezing trigger 9 to turn the air turbine. The position of the moving parts in driving is seen in FIG. 16.

By energizing solenoid 6 as soon as each screw is driven and the screw driver 2 is lifted from the work, an additional screw is immediately shot into position in the nose of the adaptor, ready for the next driving. Trigger 9 is conveniently placed to control rotation of screw driver shank 44 and bit 45, for working as fast as desired.

From the above description and the drawings, it will be apparent that jaws 62 and fingers 65 collectively may be termed a first barrier which obstructs movement of a screw out of the outlet end of passageway 55. Also, stop gate 58 may be viewed as providing a second barrier disposed upstream of the first barrier for obstructing movement of a screw away from the outlet once it has reached the fingers 65.

*Electrical controls*

In FIG. 13 a button switch 66 is shown mounted on holder 43. However, this may be placed where desired. The button switch 66 is used when the screw driver is to be manually controlled. The button switch 66 can be used with automatic switch 67 by wiring the two in series as indicated in circuit diagram 8 of FIG. 30. Automatic switch 67 is mounted on the top or bottom of cylindrical section 49. Operating pin 68 extends radially outwardly from fixed bar 69 which is attached to holder 43 as shown in FIGS. 27, 28 and 29. As the screw driver is lifted from the work, the adaptor 5 resumes its extended position, which causes the upturned end of lever 70 to move over operating pin 68. This causes insulated pin 71 mounted on contact arm 72 to press arm 72 upwardly into electrical contact with the end of contact lever 73. This is sufficient to energize solenoid 6, causing the immediate delivery of a screw into work position in the nose of adaptor 5, if switch 67 is wired for use without button switch 66. Otherwise, if the two are in series then of course button switch 66 is also necessary to be closed at this instant. As adaptor 5 continues its outward movement, operating pin 68 comes to rest above slot 74 in lever 70, seen in FIG. 29. This of course breaks the circuit. As screw driver 2 is applied again to the work, operating pin 68 moves across the top of lever 70 without closing the circuit.

A third switch 75 is mounted on the adaptor as seen in FIG. 14, on the top or bottom and opposite to the switch of FIG. 27. This switch is also automatic and is actuated by movement of the holding jaws 62 as seen in FIGS. 23 and 24. When this switch is used alone, upon completion of driving a screw, the screw head is released and the holding fingers 65 move closer together, which closes the circuit as seen in FIG. 23. This immediately impels another screw into work position in the nose of adaptor 5, if the switch 75 is wired for use without button switch 66 or automatic switch 67. This switch is faster acting than switch 67 for the reason that the solenoid is energized immediately that the holding jaws are free of the driven screw, whereas switch 67 is not closed until the adaptor 5 is close to its extended position.

Details of this switch are seen in FIGS. 23 and 24, in which the short lever 76 of conductive metal and contact point is mounted within a properly insulated open ended housing 77 attached to a side of cylindrical section 49 adjacent a holding jaw 62. The holding jaw 62 has fixed to its outer side near the inner end a strip 78 of conductive metal, such as spring brass, extending longitudinally into the open end of housing 77. At the inner end of this strip a contact point is fixed in opposition to the similar one on short lever 76. As seen in FIG. 23 these contact points are normally closed.

The three switches disclosed on this screw driver 2 are ordinarily wired according to circuit diagram 8, FIG. 30. Power is taken from a source of 115 v. 60 cycle A.C. as E.M.F.

Solenoid 6 is in series with three way selective switch 79. If switch 79 is set to position A then button switch 66 and automatic switch 67 are in series alone.

Position B for switch 79 puts switches 66, 67 and automatic adaptor switch 75 in series. Position C for switch 79 puts the automatic adaptor switch 75 alone in control of solenoid 6. A similar circuit could be provided if desired to utilize the automatic adaptor switch 75 alone in series with button switch 66. This might be preferred at times.

When button switch 66 is used alone, care must be taken not to close the switch when a screw is in position for driving, otherwise a second screw will be impelled into the nose of the adaptor. This is not serious, as the first screw can be readily withdrawn with the fingers. However, it would interrupt and slow down the work program. Hence, this is one desirability of wiring either or both of automatic switches 67 and 75 in series with the button switch 66.

The adaptor 5 is also designated a nose piece, due to its unique function. For the same reason, plunger 26 is also designated a reciprocating motor and is the motive means to operate the screw or fastener feeder. This reciprocating motor 26 is driven by air under pressure from air nipple 37.

The slide member 80 is the horizontal element shown as integrally attached to screw feed slide 12 with aperture 38 therein. However, this member 80 can be separate from feed slide 12, but is fastened to link 27, and can be shortened up to and include aperture 38.

One embodiment of the invention has been disclosed herein in detail. However, various modifications of the disclosed device can be made within the scope of the appended claims.

I claim:

1. A fastener feeding and driving mechanism comprising a fastener feeder, a flexible delivery tube, a power operated driver having a noise piece constituting the work end, the fastener feeder having a motor to operate the feeder, a pneumatic valve to release air under pressure into the delivery tube to impel a fastener into the nose piece, control means to operate the air valve and motor, and a feed track to supply fasteners to the feeder, the feeder having a feed slide movable across the adjoining end of the feed track to serve the fasteners, one by one, from the feed track, the slide having an opening therein, a spaced finger mechanically connected to the feed slide and disposed by the upper end of the opening and extending between the feed track and opening when the track and opening are aligned, the feeder having a smooth bore to receive fasteners from the feed slide, a slide member to intermittently open and close said bore, the feed slide, finger and slide member being mechanically connected to and actuated by the motor, the nose piece being connected to the tube and having means to receive and hold a fastener in extended position for driving, the control means being effective to deliver a jet of air behind a fastener after its release by the slide member, the control means being actuated from the driving mechanism to deliver a fastener to the nose piece, immediately that it is needed.

2. The mechanism of claim 1, in which the feed slide and slide member are integral.

3. The mechanism of claim 1, in which a fastener slide support, actuated by the motor, is mounted on the body of the fastener feeder for movement toward and away from registration with the outlet end of the feed track, the support having fingers to receive the fastener as it issues from the opening of the feed slide.

4. The mechanism of claim 3, in which the slide support fingers extend over the feeder bore, when adjacent the feed track.

5. A fastener and feeding and driving mechanism comprising a fastener feeder, a flexible delivery tube, a power operated driver having a nose piece with a longitudinal bore attached to its work end, a motor to operate the feeder, a pneumatic valve to release air under pressure into the delivery tube to impel a fastener into the nose piece, control means to operate the air valve and motor and a feed track to supply fasteners to the feeder, the feeder having a feed slide movable across the adjoining end of the feed track, and means to serve fasteners, one at a time, to a smooth bore in the feeder for release into the delivery tube, the feed slide being mechanically connected to and actuated by the motor, the nose piece being connected to the tube to receive and hold a fastener in extended position in the longitudinal bore for driving, the nose piece having a fastener receiving nozzle at a sharp angle to the longitudinal bore, holding jaws with fingers extending into the working end of the nose piece, the jaws being resiliently pressed inwardly, a stop gate resiliently protruding into the bore of the nose piece with a transverse surface to engage behind the head of a fastener when it is stopped by the holding jaws, the control means being effective to deliver a jet of air behind a fastener after its release by the slide, the motor and control means being actuated from the driving mechanism to deliver a fastener to the nose piece, immediately that it is needed.

6. The mechanism of claim 5, in which the stop gate has an inner cam surface protruding into the adaptor bore opposite to and in line with the nozzle, the cam surface converging inwardly toward the work end of the bore.

7. The mechanism of claim 5, in which the stop gate is hinged at its rear end on an exterior hinge pin and extends longitudinally and has a cam extending into and through a longitudinal opening in the adaptor with the cam surface protruding into the bore.

8. The mechanism of claim 5, in which the holding jaws and stop gate are pressed inwardly by a resilient ring.

9. A fastener feeding and driving mechanism comprising a fastener feeder, a flexible delivery tube, a power operated driver having a nose piece attached to its work end, a reciprocating motor to operate the feeder, a pneumatic valve to release air under pressure into the delivery tube to impel a fastener into the nose piece, control means to operate the air valve and motor, and a feed track to supply fasteners to the feeder, the feeder having a feed slide movable across the adjoining end of the feed track to serve the fasteners, one by one, from the feed track, the slide having an opening therein, a spaced finger mechanically connected to the feed slide and disposed by the upper end of the opening and extending between the feed track and opening when the track and opening are aligned, the feeder having a smooth bore to receive fasteners as they pass through the opening in the feed slide, a movable member to intermittently engage the bore, the feed slide, finger and movable member being mechanically connected to and actuated by the motor, the nose piece being connected to the tube and having means to receive and hold a fastener in extended position for driving, the control means being effective to deliver a jet of air behind a fastener after its release by the movable member, the motor and control means being actuated from the driving mechanism to deliver a fastener to the nose piece, immediately that it is needed.

10. A fastener feeding and driving mechanism comprising a fastener feeder having a smooth bore, a fastener delivery tube attached to the smooth bore, a power operated driver having a longitudinal bore and a fastener holder mounted in the work end of the driver, a motor to operate the feeder, means to impel a fastener into holding position in the fastener holder, control means to operate the motor, impelling means, and driver, a feed track pointed toward the smooth bore to supply fasteners to the feeder, the feeder having means comprising a feed slide with an opening therein, movable across the adjoining end of the feed track, to serve the fasteners, one by one, from the feed track through the opening directly into the delivery tube, the feed slide and serving means being mechanically connected to and actuated by the motor, the fastener holder having resilient means to cause the holder to yieldingly receive and positively grip the fastener in extended position for driving and to prevent retrograde movement of the fasteners, said fastener holder comprising two oppositely positioned movable holding jaws and a movable stop gate near the work end of the driver, each being resiliently biased to normally protrude into the longitudinal bore of the work end section of the driver, the stop gate serving to positively hold the fasteners extended, in position for driving and to prevent retrograde movement.

11. A fastener feeder mechanism for a fastener driver comprising a fastener feeder, a motor to operate the feeder, a fastener delivery tube outlet from the feeder, a pneumatic valve to release compressed air into the delivery tube outlet, a feed track to supply fasteners to the feeder, the feeder having a feed slide movable across the adjoining end of the feed track, the slide having an opening therein, a spaced finger mechanically connected to the feed slide and extending between the feed track and opening when the feeder and opening are aligned, the feed track having a smooth bore connected to and aligned with the delivery tube outlet, the bore being positioned to receive fasteners which pass through the opening in the feed slide, a movable closure member to intermittently open the bore, the feed slide, finger and closure member being mechanically connected to and actuated by the motor, the feed slide, closure member, and pneumatic valve comprising means to serve the fasteners into the delivery tube outlet, one by one, and release a jet of air behind each one.

12. A fastener driving mechanism comprising a power operated driver having a work end, a detachable nose piece attached to the work end of the driver and control means for operating the driver, the nose piece having a smooth bore to cooperate with the driver, a fastener receiving nozzle at a sharp angle to the bore, holding jaws with fingers extending into the work end of the nose piece, the jaws being resiliently pressed inwardly, a stop gate resiliently biased and protruding into the bore of the nose piece with a transverse surface to engage behind the head of a fastener when it is gripped by the holding jaws.

13. A fastener driving mechanism comprising a power operated driver having a smooth bore, a driving element movable in said bore, said driver having an opening into said bore to admit a fastener in advance of the work end of the driving element when the driving element is in normal position in the bore, resilient means to urge the driver to said normal position, a fastener holder mounted in the driver near its work end, the holder comprising jaw means to resiliently engage the fastener between its ends and stop means to engage the head section of the fastener to positively prevent retrograde movement of the fastener under all conditions, the jaw means and stop means being so positioned axially as to hold the fastener immovably aligned with its outer end positioned for engaging and securement in the work, under the driving force of the driving element.

14. A head for attachment to a fastener driving tool of the kind which includes a housing from which projects the driving end of a shank, comprising a body having a fastener receiving chamber which includes a passage for the reception through one end of the driving end of the shank of the driving tool, an entry tube on the body and having an exit end which opens into the chamber and another end for connection to a supply of fasteners, an adaptor member for firm attachment to the driving tool, interconnecting means between the body and the adaptor member enabling reciprocation of the adaptor member and thus of the attached driving tool relative to the body between a first position where the shank is advanced relative to the body and a second position where the shank is retracted, biasing means normally urging to the second position and adaptor member relative to the body, a fastener guiding member on the body at the other end of the aforesaid passage to receive fasteners admitted into the chamber from the entry tube and to hold them one at a time in driving position and in alignment with the shank, and a stop arm on the body for engaging the head of a fastener held by the guiding member, the said stop arm preventing a fastener on which an external load is applied from being forced back into the chamber.

15. A head for attachment to a fastener driving tool of the kind which includes a housing from which projects the driving end of a shank, comprising a body having a fastener receiving chamber which includes a passage for the reception through one end of the driving end of the shank of the driving tool, an entry tube on the body and having an exit end which opens into the chamber and another end for connection to a supply of fasteners, an adaptor member for firm attachment to the driving tool, interconnecting means between the body and the adaptor member enabling reciprocation of the adaptor member and thus of the attached driving tool relative to the body between a first position where the shank is advanced relative to the body and a second position where the shank is retracted, biasing means normally urging to the second position the adaptor member relative to the body, a fastener guiding member on the body at the other end of the aforesaid passage to receive fasteners admitted into the chamber from the entry tube and to hold them one at a time in driving position and in alignment with the shank, a stop arm having one end mounted for limited swinging movement on the body and having a free end extending through an aperture in the body and into the passage aft of the guiding member, and cooperating means of the stop arm urging it into a position where it may engage the head of a fastener held by the guiding member, the stop arm preventing a fastener on which an external load is applied from being forced back into the chamber, the cooperating means enabling the free end of the stop arm to be swung aside by a fastener to clear the passage as the fastener travels through the passage immediately prior to its reception by the guiding member.

16. Apparatus for transferring screws or the like having heads and shanks from a source of supply into a conduit comprising, means providing a passageway longitudinally communicating with said conduit, said passageway having a lateral opening through which a screw may enter said passageway with its shank oriented generally parallel to the longitudinal extent of said passageway, means providing a barrier movable to an advanced position across said lateral opening for engaging a side portion of a screw adjacent said lateral opening for barring entry of the screw into said opening, and to a retracted position substantially clear of said opening for admitting a screw therethrough into said passageway, means providing a track extending toward said lateral opening, said track having spaced apart members for engaging a screw head and a slot aligned with said lateral opening through which the shank of a screw may project, means providing a transitional support movable across said passageway to an advanced position where it is opposed to said track, and to a retracted position, said transitional support having a spaced-apart members and a slot which in said advanced position are in mutual extension respectively with members and the slot of said track, so that said transitional support forms substantially a continuation of said track, said transitional support in said advanced position thereof being operable to supportingly engage the head of a screw with the screw shank extending longitudinally within said passageway, said transitional support, responsive to movement thereof to its said retracted position being operative to disengage the screw head, whereby to release the screw for longitudinal movement in said passageway toward said conduit, and means operable to move said barrier and transitional support to said advanced and retracted positions thereof in alternate sequence so that when one of them is in its advanced position the other is in its retracted position.

17. Apparatus for transferring screws or the like having heads and shanks from a source of supply in which they are in side-by-side relation, one at a time, longitudinally into a conduit, said apparatus comprising, means providing a passageway longitudinally communicating with said conduit, said passageway having a lateral opening through which a screw may enter said passageway with its shank oriented generally parallel to the longitudinal extent of said passageway, a track leading to said lateral opening and being adapted to hold a train of screws in side-by-side relation, means providing a barrier movable to an advanced position across said lateral opening for engaging a side portion of a screw adjacent said lateral opening for barring entry of the screw into said opening, and to a retracted position substantially clear of said opening for admitting a screw therethrough into said passageway, means providing a separator displaced from said barrier in a direction away from said lateral opening by generally the distance between adjacent screw shanks in said screw train, said separator being movable to an advanced position across said track in which it projects between the screw engaged by said barrier and the adjacent screw, means providing a transitional support movable across said passageway to an advanced position where it is apposed to said track for receiving a screw therefrom, and to a retracted position, said transitional support in said advanced position thereof being operable to supportingly engage the head of a screw with the screw shank extending longitudinally of said passageway, said transitional support responsive to movement thereof to said retracted position being operable to disengage the screw head for releasing the screw for longitudinal movement in said passageway toward said conduit, and means operably connected to said barrier, separator, and transitional support, the latter said means being operable to move said barrier to said advanced and retracted positions thereof in a sequence alternate to that of said separator and transitional support so that when said barrier is in its advanced position said separator and transitional support are in their retracted positions.

18. The combination defined in claim 17 wherein said barrier and separator move transversely of said track between said positions thereof respectively and said transitional support moves longitudinally of said track between said positions thereof.

19. An adaptor for receiving a succession of articles one at a time from a source and holding them in position for receiving force from a driving mechanism, said adaptor comprising, a body having a passageway with an inlet and an outlet through which the articles may pass one at a time, means providing a first barrier operable to obstruct passage through said outlet of an article introduced into said passageway through said inlet, means providing a second barrier disposed upstream of said first barrier, said second barrier being operable in response to passage of an article to said first barrier to obstruct movement of the article away from said outlet, said body being adapted to be mounted in operative relation to a driving device and including means operable to direct driving force of said device against an article obstructed by said barriers, said first barrier being yieldable to the influence of said driving force to free the obstructed article for passage out of said outlet.

20. The combination defined in claim 19 wherein said second barrier includes means yieldably urged into said passageway, the latter said means being deflectable against the urging force thereon responsive to passing thereof by an article en route to said first barrier and being thereafter returnable by said urging force to article obstructing relation.

21. The combination defined in claim 19 wherein said passageway has a lateral opening, said second barrier including an element mounted in said opening for movement toward and away from the interior of said passageway, said combination including means yieldably urging said element to a position where it projects into said passageway, said element being deflectable outwardly against the urging force of said yieldable means to pass an element to said first barrier, said element being returnable to said inward position under said urging force for obstructing the passed article as described.

22. The combination defined in claim 21 wherein said element is rockably mounted in said lateral opening, said element having an inclined surface exposed to the passageway interior and providing a cam engageable by a passing article for deflecting said element.

23. The combination defined in claim 22 wherein said element has a free end forming a shoulder which in inward position of said element obstructs the passed article as described.

24. The combination defined in claim 19 wherein said first and second barriers are spaced apart longitudinally of said passageway by about the thickness of a head of an article such as a screw with which said adaptor and mechanism are adapted to be used.

25. The combination defined in claim 19 wherein said barriers are substantially aligned with said outlet, said means operable to direct driving force including an opening in said body longitudinally aligned with said outlet and adapted to guide a tool such as a screw driver toward an article positioned between said barriers.

26. The combination defined in claim 25 wherein said second barrier includes means yieldably urged into said passageway, the latter said means being deflectable against the urging force thereon responsive to passing thereof by an article en route to said first barrier and being returnable by said urging force to article obstructing relation, said second barrier also being deflectable against said urging force to pass said tool for engagement with an article positioned between said barriers.

27. The combination defined in claim 25 wherein both of said barriers are yieldable to the longitudinal driving force of said tool and said tool is projectable through said outlet clear of said body for driving an article into a workpiece.

28. Apparatus for introducing articles one at a time into a tube and propelling them pneumatically through the tube, said apparatus comprising,
   means providing a passageway longitudinally communicating with said tube and having a first portion with an opening,
   escapement means operable to introduce articles one at a time through said opening into said first portion of said passageway,
   means providing a closure movable to an advanced position in which it extends across and closes said passageway between said opening and said tube, and to a retracted position substantially clear of said passageway,
   a pneumatically operated motor operable to move said closure to said positions thereof,
   a valve controlling the supply of air to said motor,
   an air line, the supply of air to which is controlled by said valve,
   said air line communicating with a second portion of said passageway substantially aligned with said first portion and being disposed on the opposite side of said closure from said first portion,
   said valve and air line being so constructed and arranged that by operation of said valve air under pressure is introduced into and relieved from said second portion,
   said valve, motor, and air line being operatively interrelated so that said closure is in its advanced position while air under pressure is introduced into said second portion of said passageway, whereby to close said passageway against the escape of air through said opening and facilitate propulsion of an article through said tube,
   said valve, motor, and air line being operatively interrelated so that said closure is moved to said retracted position when air pressure in said second portion of said passageway is relieved, whereby to open said passageway for introduction of an article from said first portion to said second portion,
   and actuating means operable to actuate said escapement for introducing an article into said first portion of said passageway in timed relation to operation of said motor.

29. Apparatus for transferring screws or the like having heads and shanks from a source of supply into a conduit comprising,
   means providing a passageway longitudinally communicating with said conduit,
   said passageway having a lateral opening through which a screw may enter said passageway with its shank oriented generally parallel to the longitudinal extent of said passageway and disposed toward said conduit,
   means providing a barrier movable to an advanced position across said lateral opening for engaging a side portion of a screw adjacent said lateral opening for barring entry of the screw into said opening, and to a retracted position substantially clear of said opening for admitting a screw therethrough into said passageway,
   support means outside of said passageway aligned with said lateral opening and adapted to supportingly engage the head of a screw whose side portion is engaged against said barrier,
   means providing a transitional support movable across said passageway to an advanced position where it is apposed to said support means for receiving a screw therefrom, and to a retracted position,
   said transitional support, in said advanced position thereof, being operable to supportingly engage the head of a screw with the screw shank extending longitudinally within said passageway toward said conduit, said transitional support, responsive to movement thereof to said retracted position, being operable to disengage the screw head for releasing the screw for shank-first longitudinal movement in said passageway toward said conduit,
   and means operable to move said barrier and transitional support to said advanced and retracted positions thereof in alternate sequence so that when one of them is in its advanced position the other is in its retracted position,
   said support means including two spaced-apart track members which supportingly engage the head of a screw and an intermediate slot through which the screw shank projects,
   said transitional support including two spaced-apart fingers and an intermediate slot which, in said advanced position of said transitional support, forms substantially a continuation of said support means.

30. Apparatus for transferring screws or the like having heads and shanks from a source of supply into a conduit comprising,
   means providing a passageway longitudinally communicating with said conduit, said passageway having an end portion for receiving a screw,
   presenting means operable to present a succession of screws to a location adjacent said end portion,
   separator means and introducing means operably interposed between said presenting means and said end portion,
   said separator means being operable to pass screws one at a time from said succession to said introducing means,
   said introducing means being operable successively to receive screws from said separator means and to pass the same to a position aligned with said end portion,
   means providing a transitional support movable to one position coinciding substantially with the first-mentioned position for receiving a screw passed by said introducing means and to a position retracted therefrom,
   said transitional support in said one position thereof being operable to supportingly engage the head of a screw with the screw shank extending longitudinally of said passageway toward said conduit,
   said transitional support, responsive to movement thereof to said retracted position, being operable to disengage the screw head for releasing the screw for shank-first longitudinal movement in said passageway toward said conduit,
   and means operable to actuate said separator means, introducing means, and transitional support in sequence so that they cooperate to transfer a screw from said succession into said passageway in successive steps.

31. The combination defined in claim 30 wherein movement of said transitional support between said positions thereof is generally diametrically across said end portion of said passageway toward and away from said location adjacent the same.

32. Apparatus for transferring screws or the like having heads and shanks from a source of supply into a conduit comprising, means providing a passageway longitudinally communicating with said conduit, and said passageway having an end portion for receiving a screw, operating means operable to present a succession of screws in side-by-side relation to a location adjacent said end portion, separator means and introducing means operably interposed between said presenting means and said end portion, said separator means being operable to pass screws sideways one at a time from said succession to said introducing means, said introducing means being operable successively to receive screws from said separator means and to pass the same sideways to a position aligned with said end portion, means providing a transitional support movable across said passageway to one position coinciding substantially with the first-mentioned position for receiving a screw passed by said introducing means and to a position retracted therefrom, said transitional support in said one position thereof being operable to supportingly engage the head of a screw with the screw shank extending longitudinally of said passageway toward said conduit, said transitional support responsive to movement thereof to said retracted position being operable to disengage the screw head for releasing the screw for shank-first longitudinal movement in said passageway toward said conduit, and means operable to actuate said separator means, introducing means, and transitional support in sequence so that they cooperate to transfer a screw into said passageway in successive steps.

33. The apparatus defined in claim 32 and including in addition a closure movable to one position in which it closes said passageway between said end portion and said conduit to a retracted position, means operable to move said closure and transitional support to said one position and retracted position thereof respectively in alternate sequence so that said closure in said one position thereof obstructs movement of a screw passing through said passageway, said closure in said retracted position being operable to release an obstructed screw for continued movement through said passageway, and air-introducing means operable when said closure is in said one position to introduce air under pressure into said passageway downstream of said closure to propel a screw through said conduit.

34. The combination defined in claim 33 wherein said separator means, introducing means, transitional support, and closure are actuated by common motor means.

35. The combination defined in claim 33 wherein said separator means, introducing means, and closure have elements which move in paths generally parallel to each other and wherein the path of movement of said transitional support is substantially perpendicular to the paths of movement of said elements.

36. The combination defined in claim 35 wherein said elements are connected with and move substantially parallel to a reciprocable member of a fluid-pressure motor, a link drivingly interconnecting said motor member and transitional support, the interconnection whereof includes means operable to convert movement by said motor member into movement in said substantially perpendicular path by said transitional support.

37. The combination defined in claim 36 wherein said converting means includes a way confining said transitional support to said substantially perpendicular path of movement, and cam and follower means interconnecting said transitional support and link.

References Cited by the Examiner

UNITED STATES PATENTS

| | | | |
|---|---|---|---|
| 2,373,992 | 4/1945 | Billinghurst | 144—32 |
| 2,534,140 | 12/1950 | Moore | 144—32 |
| 2,544,165 | 3/1951 | Krasnow | 144—32 |
| 2,657,721 | 11/1953 | Shaff | 144—32 |
| 2,706,504 | 4/1955 | Moore | 144—32 |
| 2,754,860 | 7/1956 | Moore et al. | 144—32 |
| 2,870,805 | 1/1959 | Zakrzewski et al. | 144—32 |
| 2,886,076 | 5/1959 | Shinkle et al. | 144—32 |
| 2,886,077 | 5/1959 | Rafferty et al. | 144—32 |
| 2,989,750 | 6/1961 | McIlvin | 1—106 |

DONALD R. SCHRAN, *Primary Examiner.*

WALTER S. SCHEEL, WILLIAM W. DYER, JR.,
                                                      *Examiners.*

W. FELDMAN, *Assistant Examiner.*